US006966779B1

(12) United States Patent
Bachelor

(10) Patent No.: US 6,966,779 B1
(45) Date of Patent: Nov. 22, 2005

(54) EDUCATIONAL AUDIO/VISUAL CLOCK

(76) Inventor: Davidson Bachelor, 5055 Estate Tipperary, C/Sted, St. Croix (VG) 00820

( * ) Notice: Subject to any disclaimer, the term of this patent is extended or adjusted under 35 U.S.C. 154(b) by 71 days.

(21) Appl. No.: 10/419,028

(22) Filed: Apr. 18, 2003

(51) Int. Cl.[7] ............................................. G09B 19/12
(52) U.S. Cl. ...................... 434/304; 434/304; 434/394; 368/63; 368/75; 368/223; D10/1; D10/2; D10/3; D10/15
(58) Field of Search ............................... 434/304, 308, 434/309, 319, 394; 368/28–30, 63, 75–77, 368/80, 84, 223, 272–273; D10/1–3, 15

(56) References Cited

U.S. PATENT DOCUMENTS

| | | | |
|---|---|---|---|
| 2,493,138 A * | 1/1950 | Hathaway | 434/304 |
| 3,490,226 A * | 1/1970 | Anderson et al. | |
| 3,763,648 A * | 10/1973 | Pakter et al. | 368/41 |
| 3,829,989 A * | 8/1974 | Pecoraro | 434/304 |
| 5,199,009 A * | 3/1993 | Svast | |
| 5,455,808 A * | 10/1995 | Grupp et al. | 368/82 |
| 6,842,404 B2 * | 1/2005 | Haselberger | 368/223 |

FOREIGN PATENT DOCUMENTS

JP            409096687 A  *  4/1997

* cited by examiner

Primary Examiner—Chanda L. Harris
(74) Attorney, Agent, or Firm—Michael I. Kroll

(57) ABSTRACT

An educational audio visual clock having an image window adjacent each numeral on the clock face to show the images of twelve Presidents of the United States at any given time. Images are on an image plate behind the clock face and display the images of the first twelve presidents from midnight until noon wherein the image plate is rotated to reveal the images of the second twelve Presidents of the United States for the next twelve hours, at which point the image wheel returns to its original position. At the top of each hour an LED illuminates the corresponding presidential image and an audio device plays an audio clip related to that president.

9 Claims, 12 Drawing Sheets

EDUCATIONAL AUDIO/VISUAL CLOCK

BACKGROUND OF THE INVENTION

Field of the Invention

The present invention relates generally to clocks and, more specifically, to clocks with images and audio clips. The present invention is an analog clock comprising a clock housing, digital liquid crystal date display, speakers, hands that are illuminated, pictorial display windows at each hour position and an audio device.

The clock features the first 24 presidents of the United States of America in picture form. Images of twelve presidents are visible at any given time with the first through twelfth presidents visible in the windows during the A.M. hours and images of the thirteenth through twenty-fourth presidents visible during the P.M. hours. When the hands of the clock strike 1:00 A.M. a recorded message will say George Washington's name, what number president he was in office, date of term and other relevant information regarding his term in office. At 2:00 A.M. a recorded message will begin regarding relevant information pertaining to John Adam's term in office.

After 12 noon the image plate rotates slightly to align the thirteenth through twenty-fourth president with their respective display windows where they will remain through the next twelve hour cycle. At 1:00 PM in the afternoon, a message plays the pertinent information regarding the thirteenth president Millard Fillmore and so forth.

While other clocks may be suitable for the purposes for which they were designed, they would not be as suitable for the purposes of the present invention, as hereinafter described.

The present invention is an analog clock comprising a clock housing, a digital liquid crystal date display, speakers, analog hands that are illuminated, pictorial display frames at every hour position and voice activation. A display window is present at each numeric position on the clock face. A rotatable image plate is underneath the clock face with the images of two presidents located near each display window. The image plate is positioned so that the first twelve presidents are visible during the A.M. hours with the first United States president (George Washington) at the display window corresponding with the numeral one and so on. After 12 noon the image plate rotates slightly to align the thirteenth through twenty-fourth presidents with their respective display windows where they will remain through the next twelve hour cycle. A recorded message announces the pertinent information regarding each president as the clock strikes their respective hour.

SUMMARY OF THE PRESENT INVENTION

A primary object of the present invention is to provide an analog clock that consists of a clock housing, a digital liquid crystal date display, speakers, hands that are illuminated, pictorial display frames at every hour position and audio clips.

Another object of the present invention is to provide an analog clock that features the first 24 presidents of the United States of America in picture form.

Yet another object of the present invention is to provide an analog clock that features the first 24 presidents of the United States of America in picture form with audio clip.

Still yet another object of the present invention is to provide an analog talking clock that on the hour activates an audio clip revealing information pertaining to the president related to that particular hour.

Another object of the present invention is to provide an analog talking clock wherein the audio clip will say the president's name, what number president he was in office, date of term and other relevant information regarding his term in office.

Still yet another object of the present invention is to provide analog talking clocks that are supplied in a variety of sizes and shapes and are battery operated.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
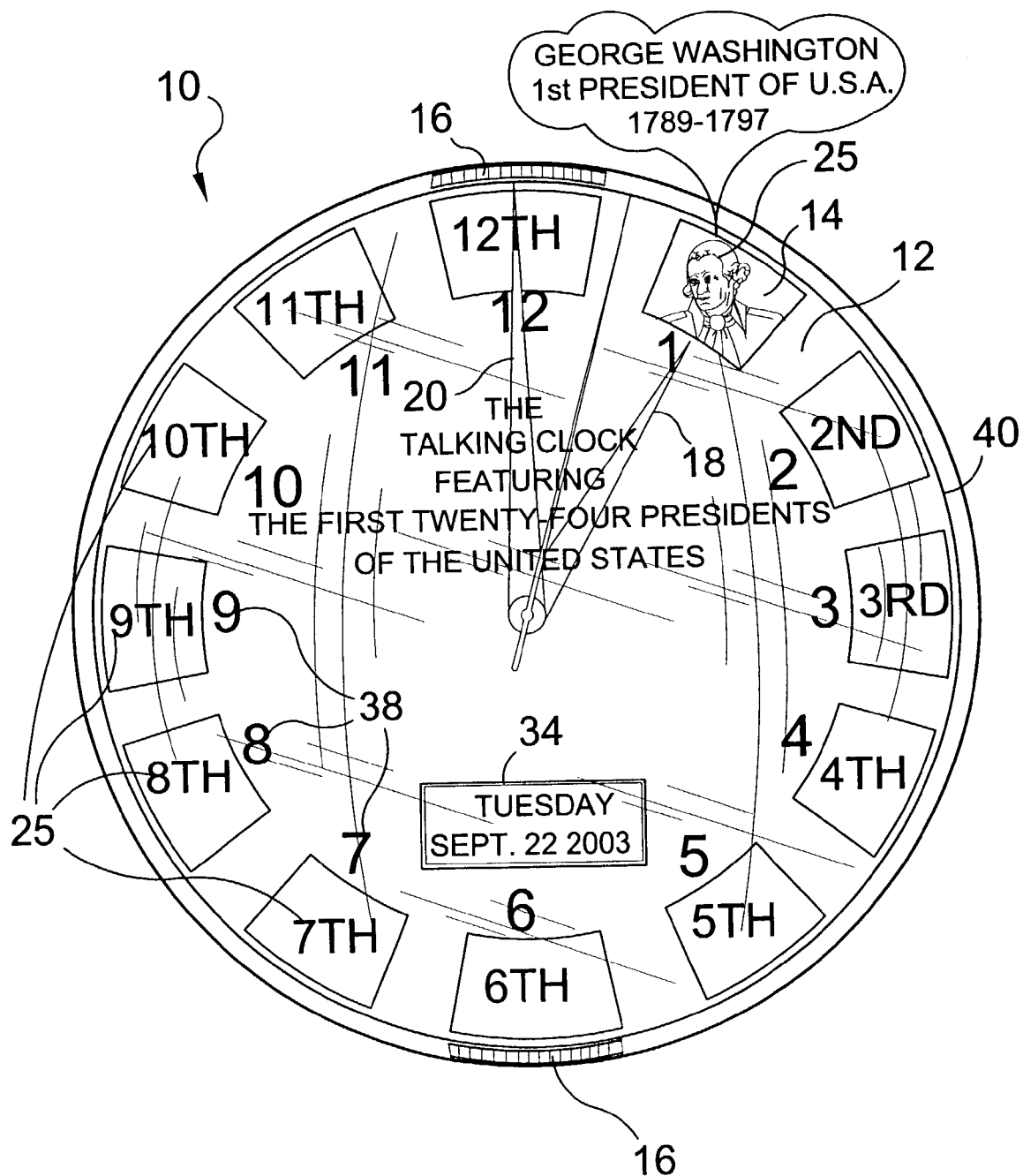
FIG. 1 is a front view of the present invention in use.

Turning now descriptively to the drawings, in which similar reference characters denote similar elements throughout the several views, the figures illustrate the Educational Audio/Visual Clock of the present invention. With regard to the reference numerals used, the following numbering is used throughout the various drawing figures.

10 Educational Audio/Visual Clock of the present invention
12 clock face
14 image plate
15 audio device
16 speaker
18 illuminated hour hand
20 illuminated minute hand 22 light emitting diode (LED)
24 image window
25 image
26 electromagnetic module
28 gear box
30 connecting member
34 liquid crystal display (LCD)
36 power source
38 indicia
40 protective lens
42 audio message
44 first set of images
46 second set of images
48 alarm
50 battery
52 alarm set wheel
54 time set wheel
56 LCD setting control

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is a front view of the present invention 10 in use. The clock of the present invention 10 is a talking clock and features the first 24 presidents of the United States in picture form. The images 25 of 12 presidents will appear on the face of the clock 12 at any given time with the first set of 12 presidents 44 visible during the A.M. hours and the second set of images 46 including the thirteenth through twenty-fourth presidents visible during the P.M. hours. When the hands 18, 20 of the clock strike 1:00 A.M. a recorded audio message 42 will say George Washington's name, what number president he was in office, date of term and other relevant information regarding his term of office. At 2:00 A.M. John Adams audio message 42 will begin regarding relevant information about his term in office and so forth.

Figure 2:
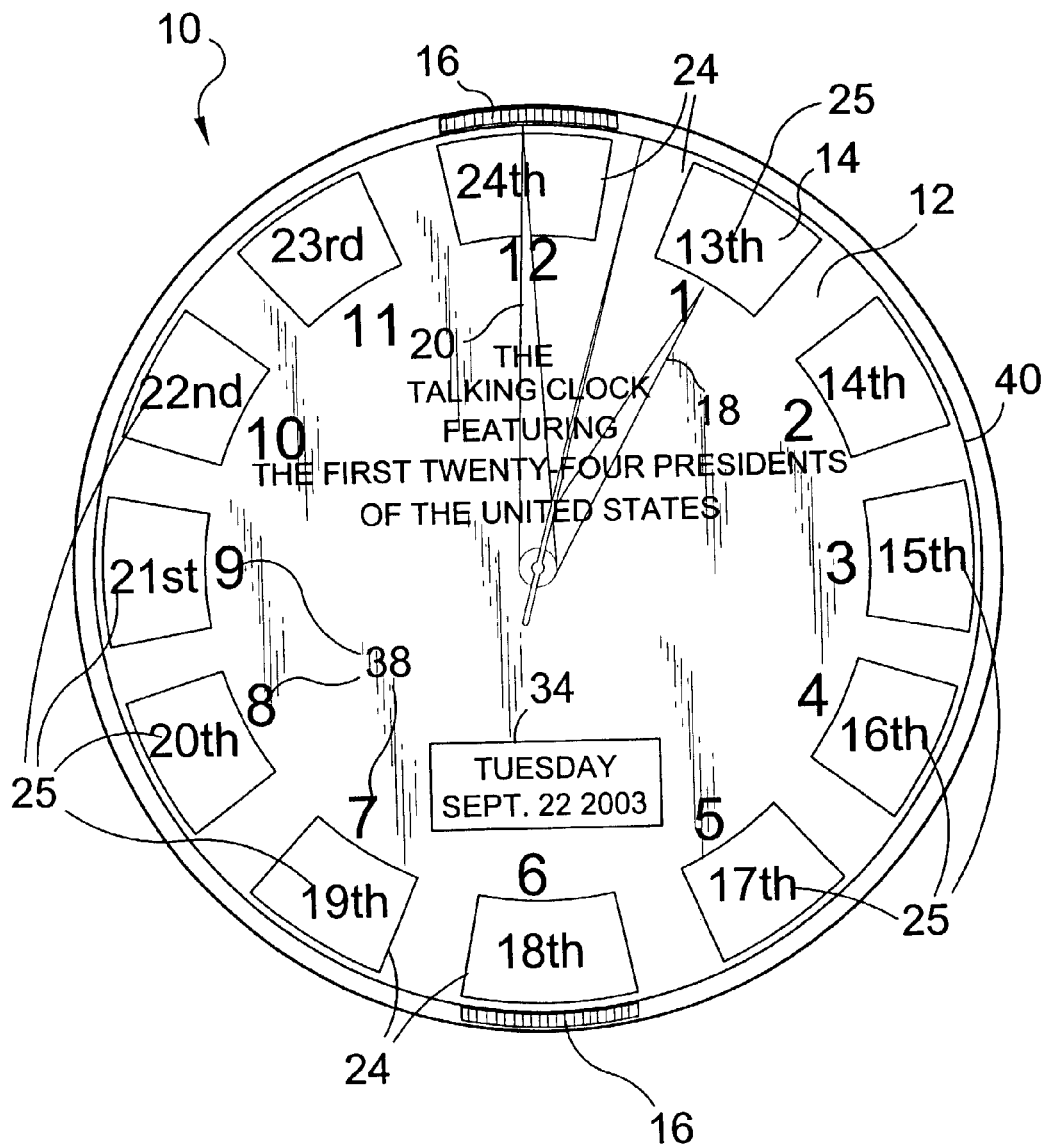
FIG. 2 is a front view of the present invention.

FIG. 2 is a front view of the present invention 10. Shown is the clock face 12 as it appears during the P.M. hours. Image windows 24 in the clock face 12 provide visibility of the president's images 25 that are on an image plate 14 underneath. The image plate 14 rotates clockwise or counterclockwise accordingly after the 12:00 messages 42 to expose the images 25 of the 12 appropriate presidents. The clock of the present invention 10 provides analog illuminated clock hands 18,20, a digital liquid crystal display 34, pictorial images 25 and an audio device 15.

Figure 3:
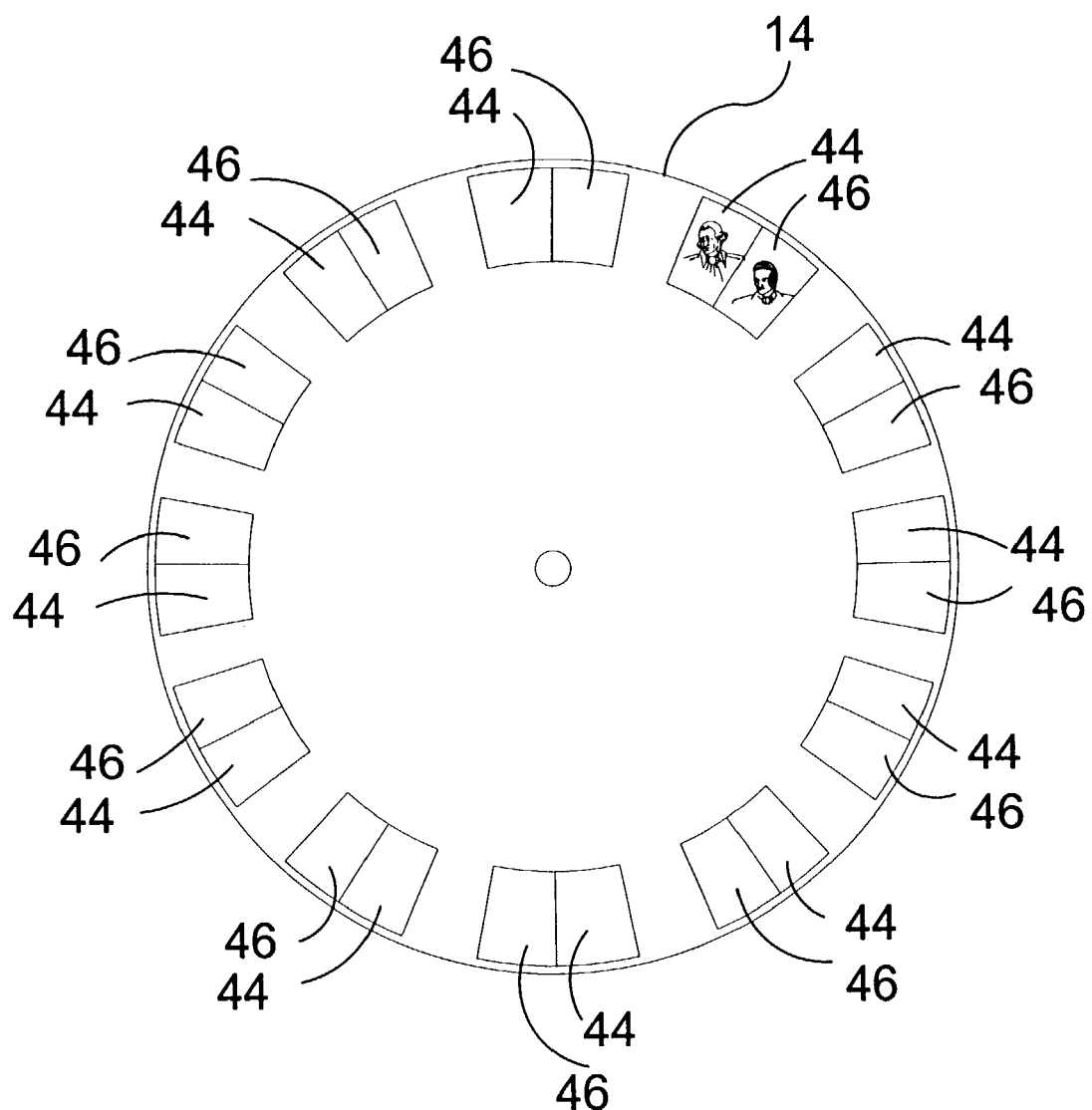
FIG. 3 is a front view of the image plate of the present invention.

FIG. 3 is a front view of the image plate 14 of the present invention 10. The image plate 14 provides pictorial images 25 of the first 24 presidents of the United States. During the A.M. hours the first set of 12 presidents images 44 appear in the image windows 24 of the clock face 12. The image plate 14 rotates after the audio message 42 regarding the 12th president is announced to reveal the second set of images 46 including the thirteenth through twenty-fourth presidents for the P.M. hours. The image plate 14 then rolls back after the audio message 42 at midnight to the first set of images 44 including the first twelve presidents.

Figure 4:
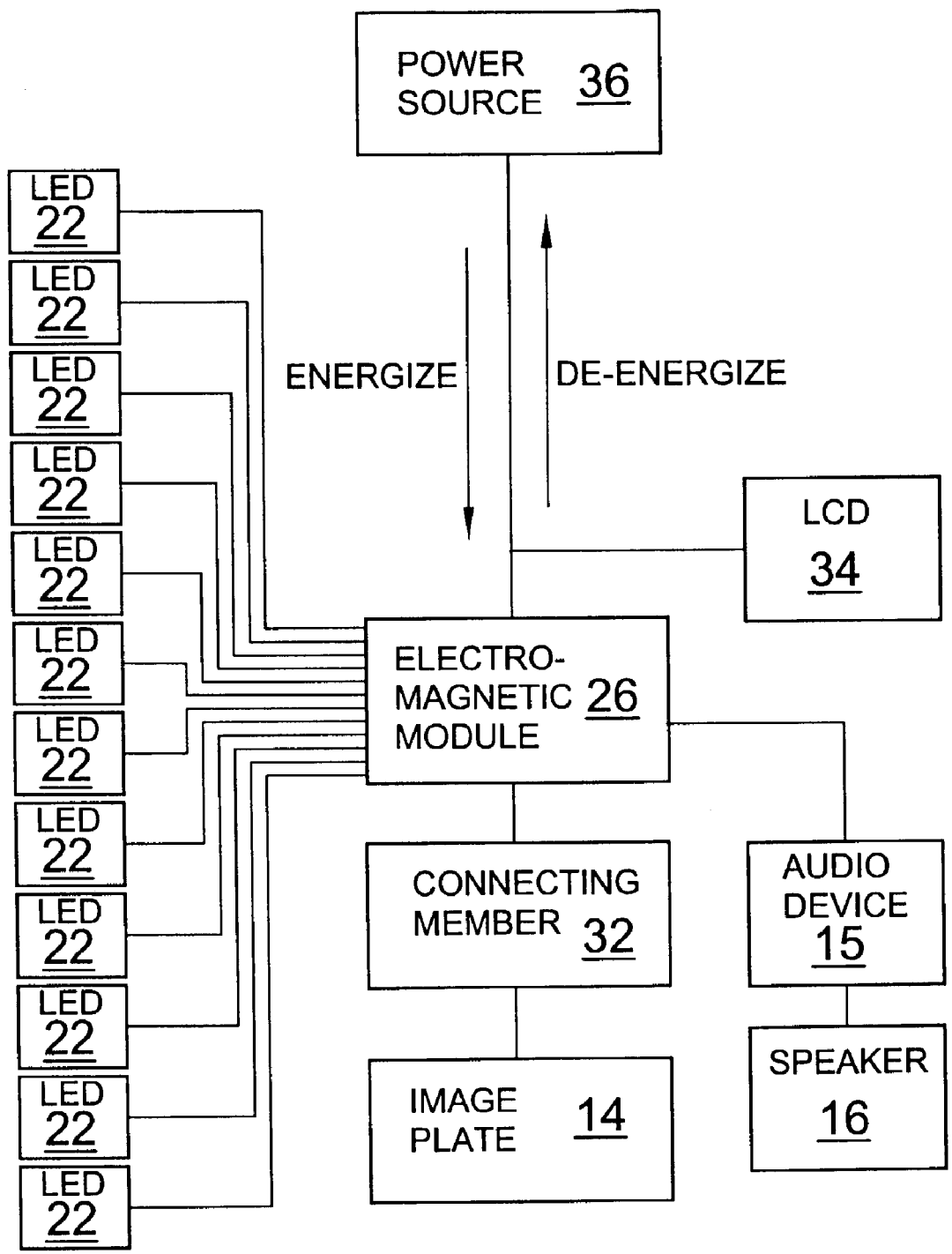
FIG. 4 is a flow diagram of the movement of the presidential display.

FIG. 4 is a block diagram of the movement of the electromechanical relations of the various components of the present invention 10. Shown are an electromagnetic module 26 and the operation of the image plate 14 activation and deactivation mode. The electromagnetic module 26 coordinates the operation of the LED 22 backlighting and the audio device 15.

Figure 5:
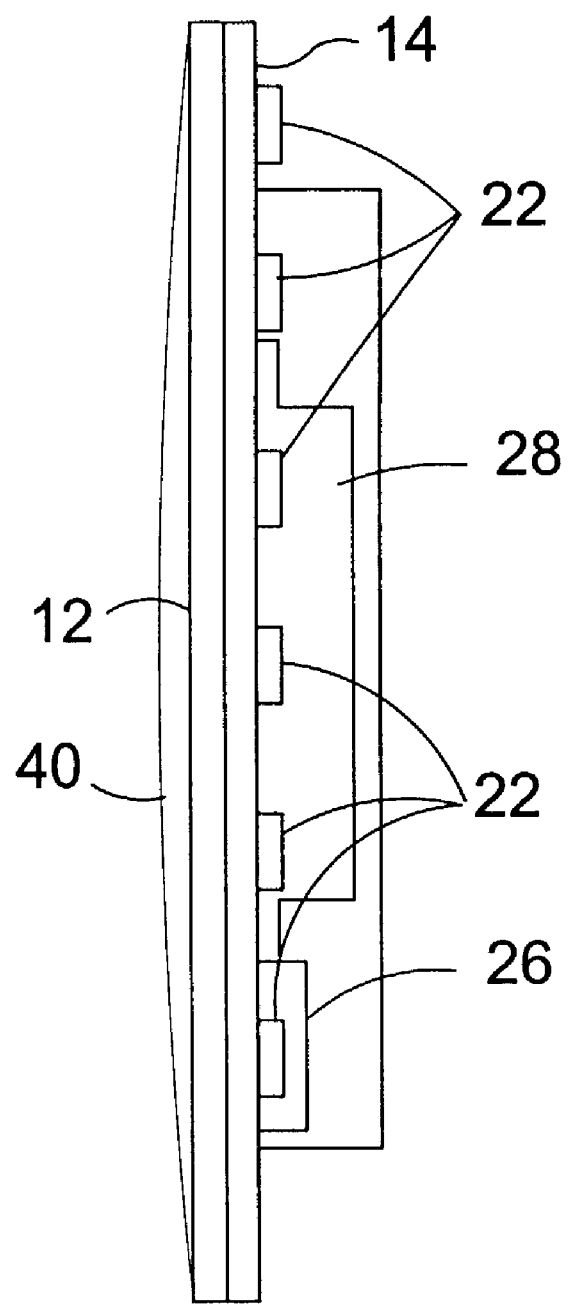
FIG. 5 is a side view of the present invention.

FIG. 5 is a side view of the present invention 10. The electromagnetic module 26 controls the connecting member 30 that activates and deactivates the switching of the image plate 14 with the associated hour. When an image 25 appears in a lighted image window 24, an audio message 42 comes over the speaker 16 revealing information about that president.

Figure 6:
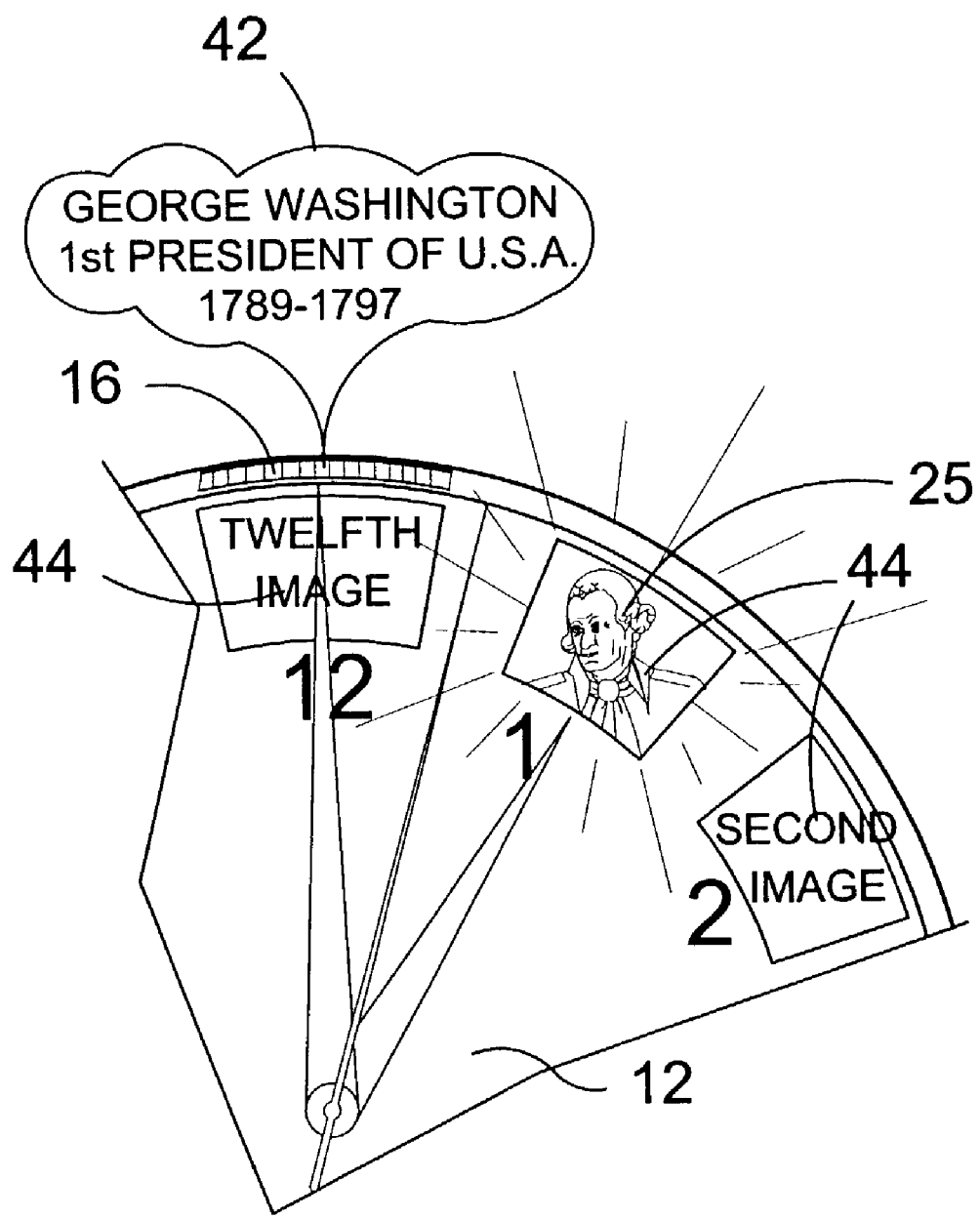
FIG. 6 is a sectional view of the present invention.

FIG. 6 is a sectional view of the present invention 10. Shown is a sectional view of the present invention 10 at the 1:00 A.M. position with an illuminated image 25 of the president's figure in conjunction with an audio message 42.

Figure 7:
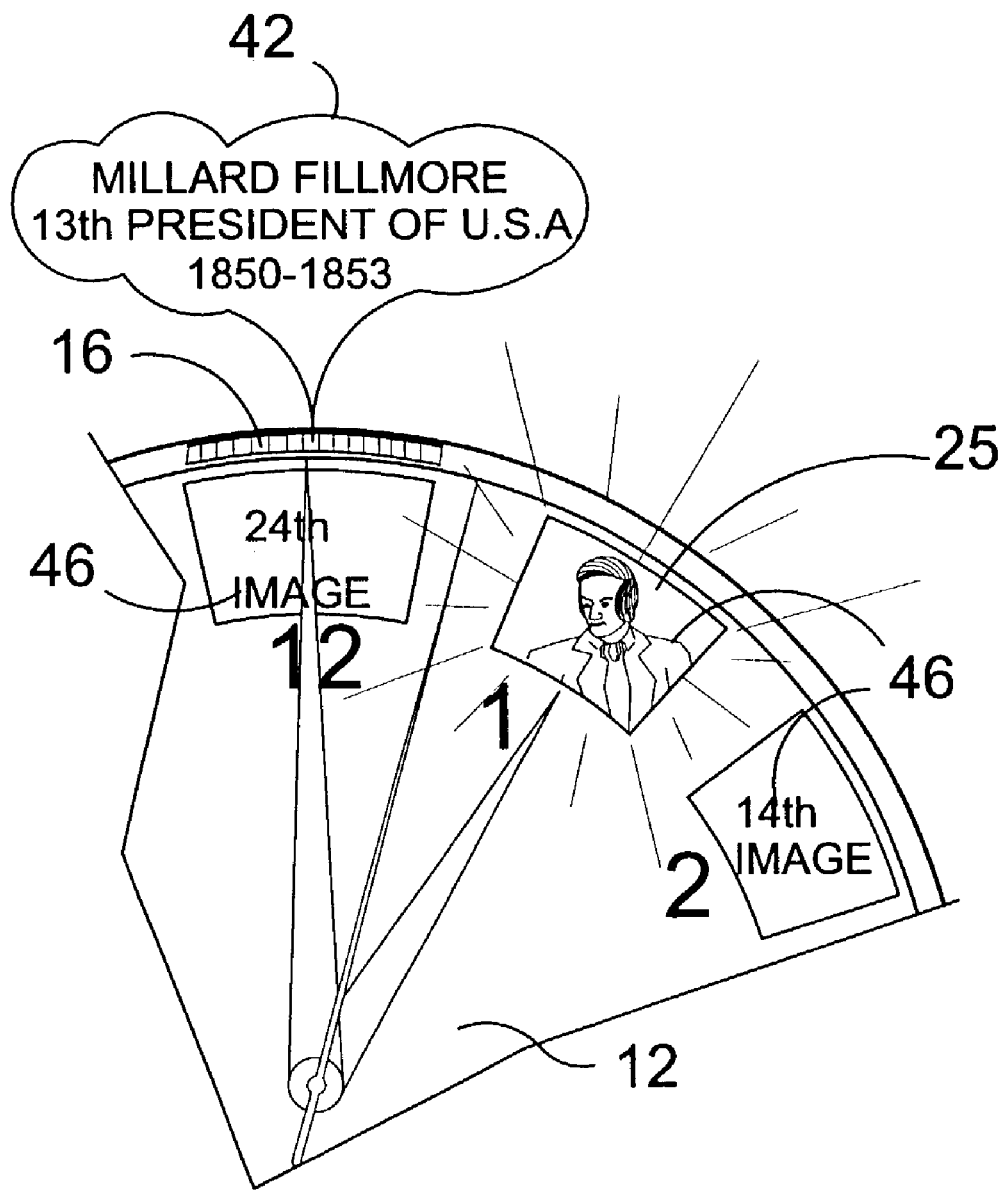
FIG. 7 is a sectional view of the present invention.

FIG. 7 is a sectional view of the present invention 10. Shown is a sectional view of the present invention 10 at the 1:00 A.M. position with an illuminated image 25 of the president's figure in conjunction with an audio message 42.

Figure 8:
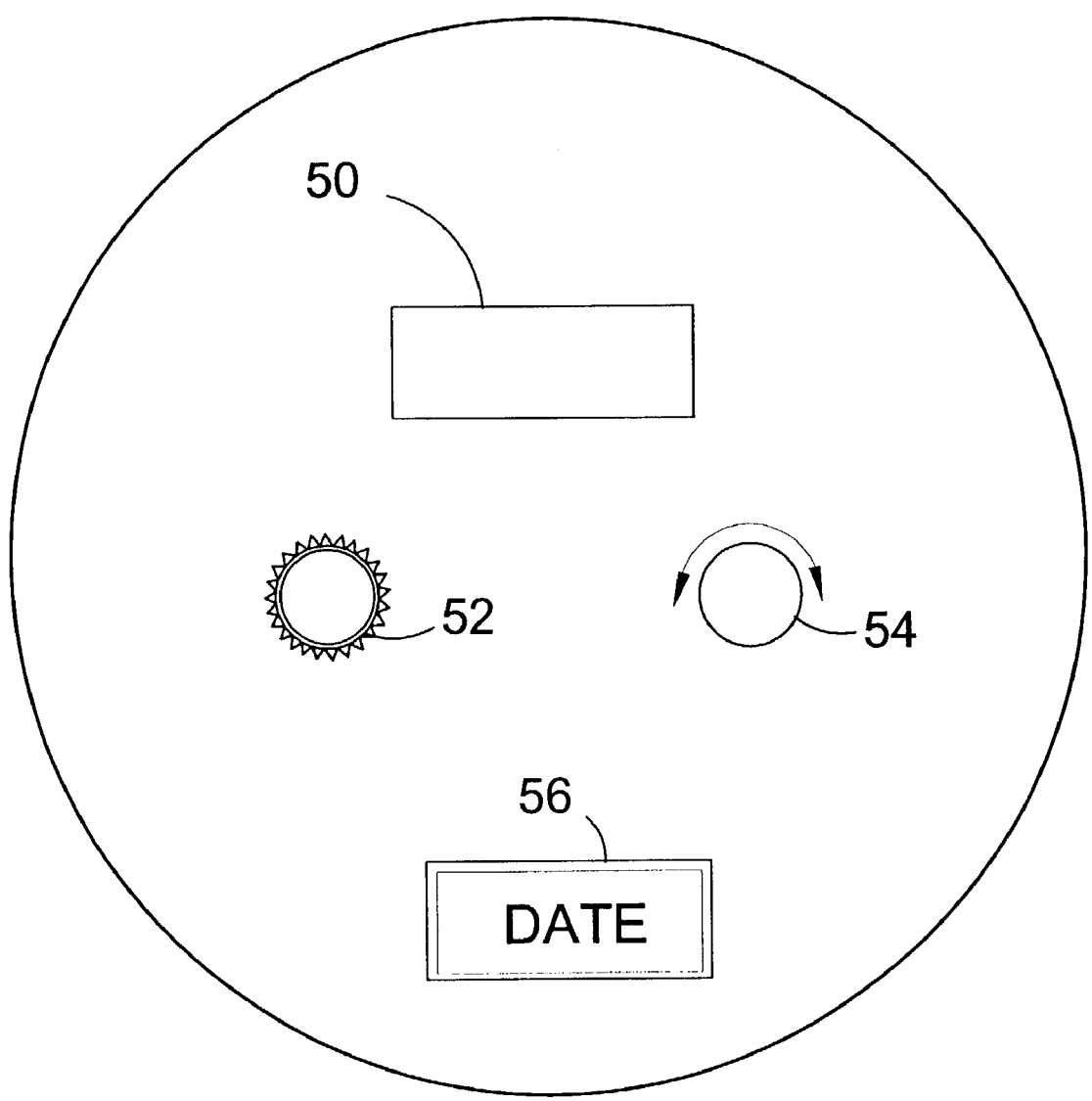
FIG. 8 is a rear view of the present invention.

FIG. 8 is a rear view of the present invention 10. The clock of the present invention 10 provides an alarm adjust wheel 52, time adjust wheel 54, clock battery 50 and compartment and a liquid crystal digital date setting 56.

Figure 9:
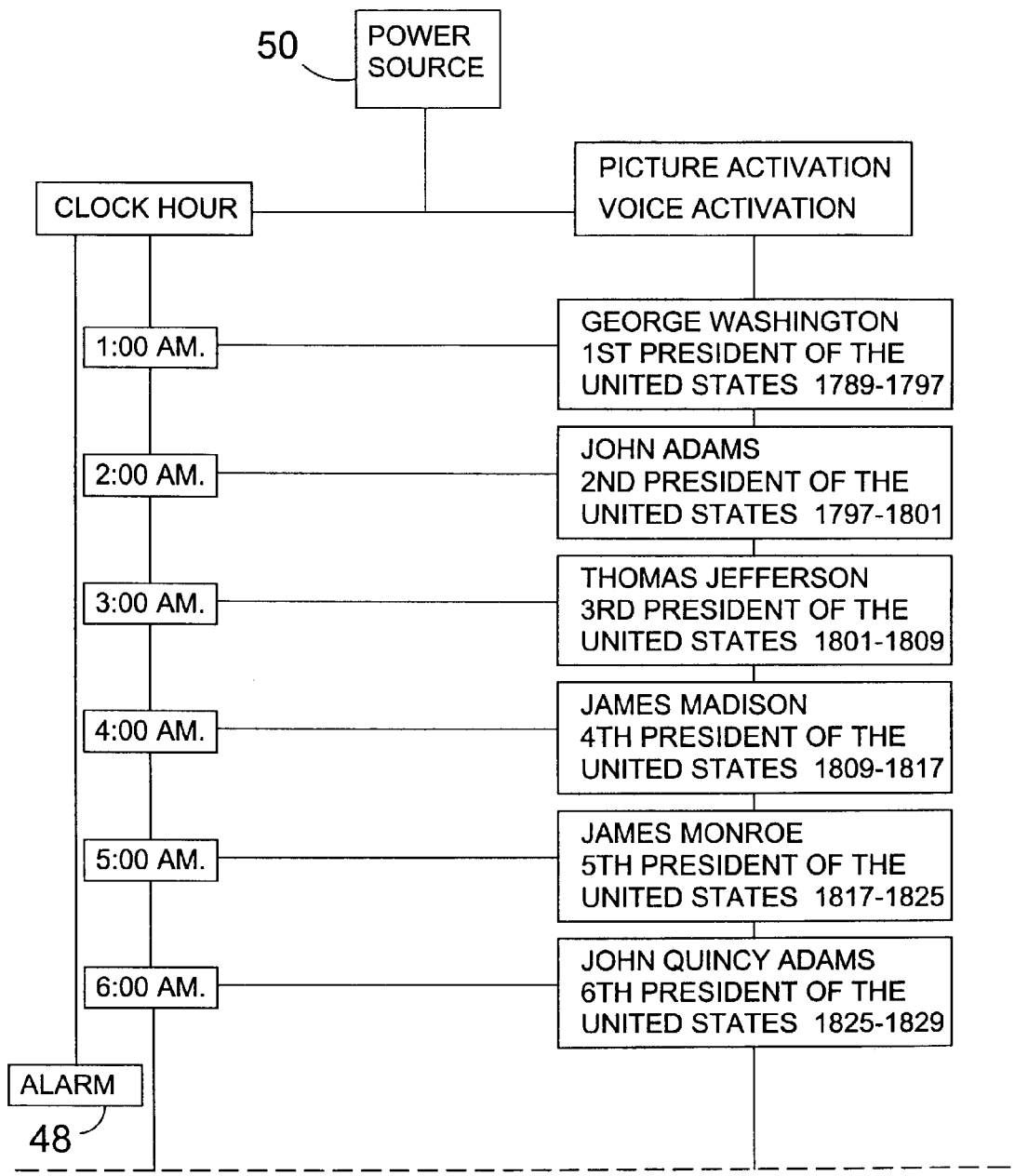
FIG. 9 is a block diagram of the present invention.

FIG. 9 is a block diagram of the present invention 10. The block diagram shows the relationship between the clock hour and the image 25 display of the president that is illuminated by the corresponding LED 22 at the appointed time and the audio message 42 is activated.

Figure 10:
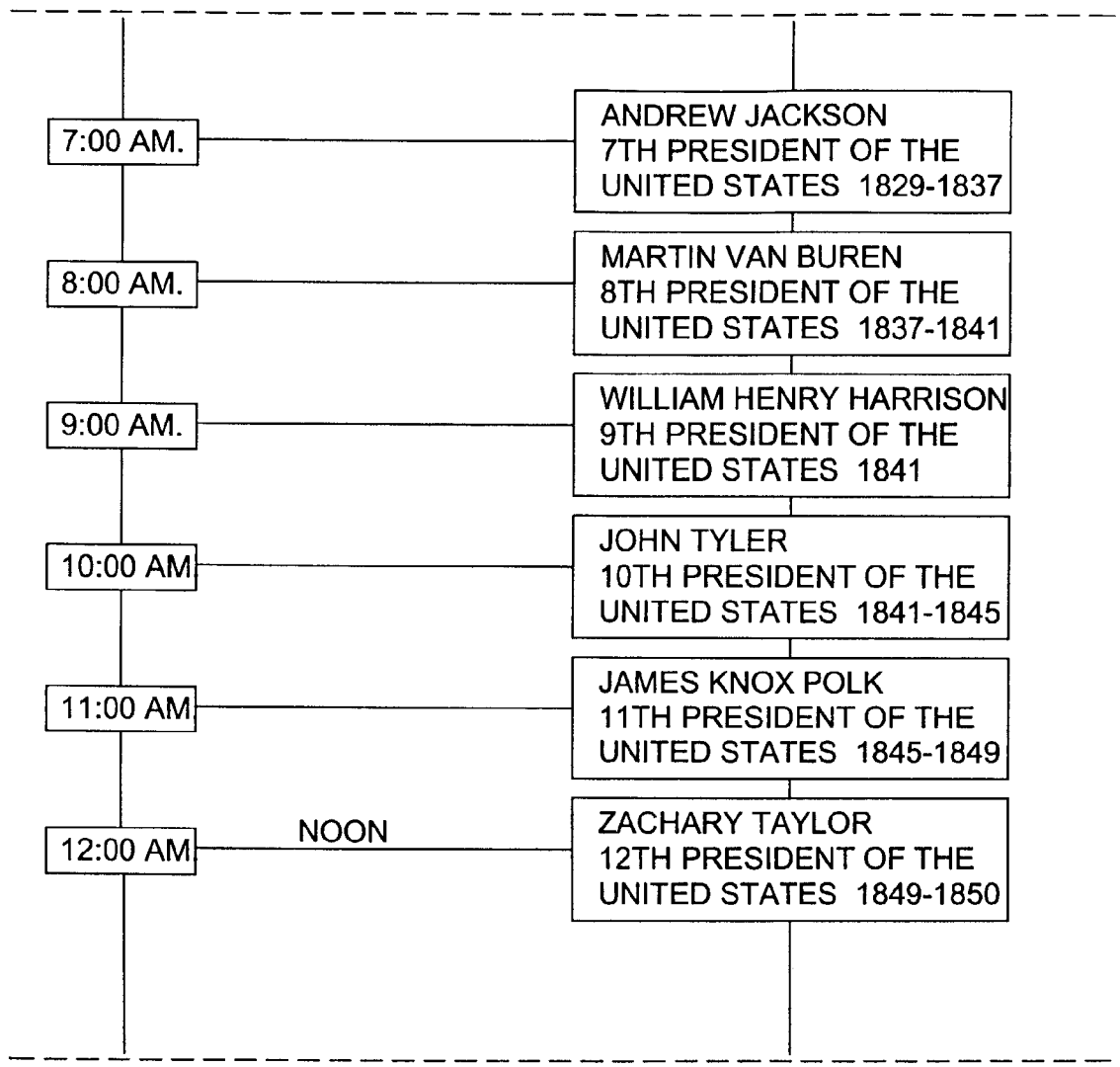
FIG. 10 is a block diagram of the present invention.

FIG. 10 is a block diagram of the present invention 10. The block diagram shows the relationship between the clock hour and the image 25 display of the president that is illuminated by the corresponding LED 22 at the appointed time and the audio message 42 is activated.

Figure 11:
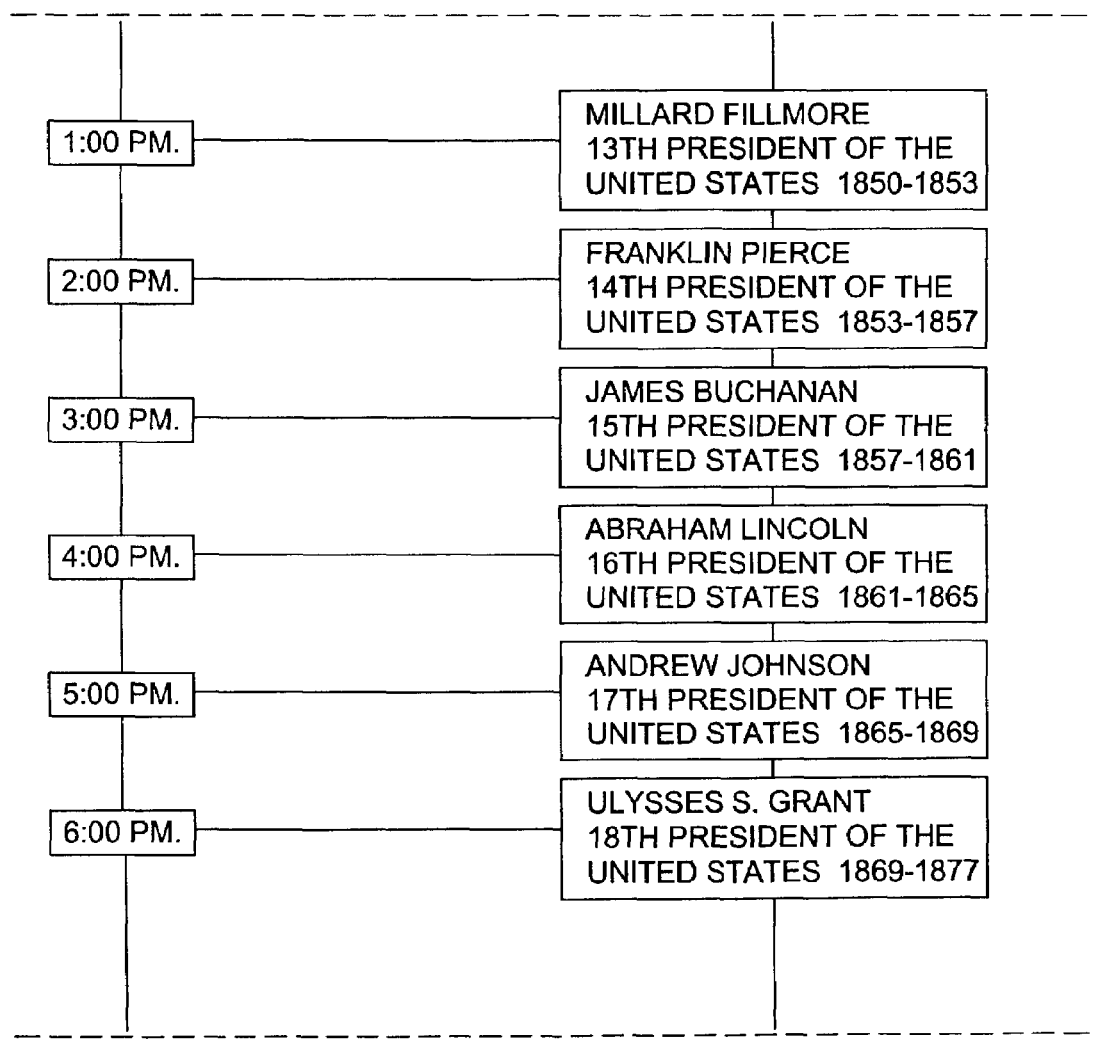
FIG. 11 is a block diagram of the present invention.

FIG. 11 is a block diagram of the present invention 10. The block diagram shows the relationship between the clock hour and the image 25 display of the president that is illuminated by the corresponding LED 22 at the appointed time and the audio message 42 is activated.

Figure 12:
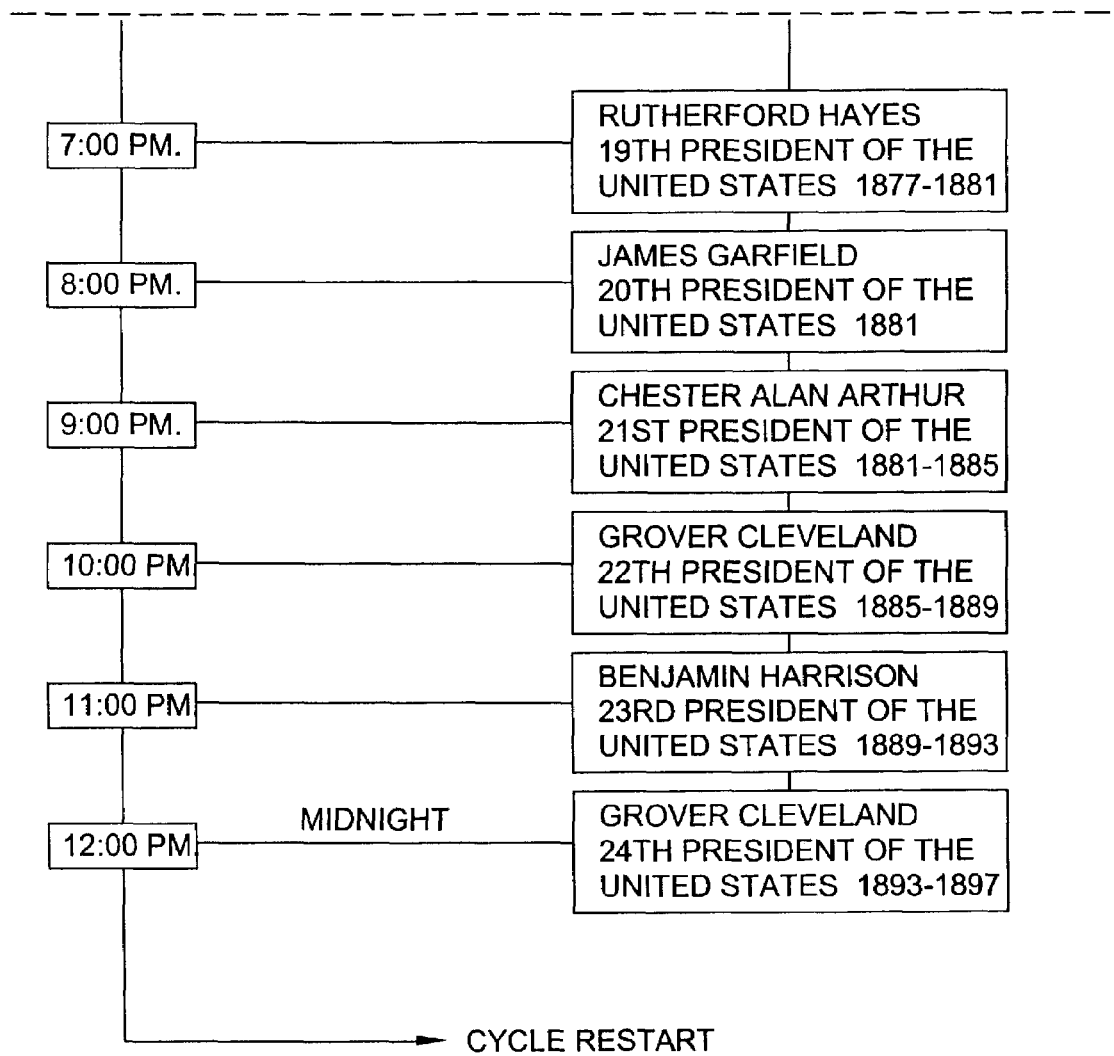
FIG. 12 is a block diagram of the present invention.

FIG. 12 is a block diagram of the present invention 10. The block diagram shows the relationship between the clock hour and the image 25 display of the president that is illuminated by the corresponding LED 22 at the appointed time and the audio message 42 is activated.

What is claimed as new and desired to be protected by Letters Patent is set forth in the appended claims:

1. An educational audio/visual clock comprising:
    a) means for displaying the current time comprising an analog clock face having a front side and a rear side, numeric hour indicia on said front side of said clock face, a minute hand, an hour hand substantially shorter than said minute hand, a protective lens spaced apart from and covering said front side of said clock face and means for setting the time;
    b) means for visually displaying different images at pre-determined intervals as indicated by said time displaying means;
    c) means for playing an audio clip specific to the corresponding image that is displayed by said visual display means;
    d) means for coordinating each audio clip with a corresponding image;
    e) a power source; and
    f) said means for displaying images comprising:
        i) an image window adjacent each said numeric hour indicia;
        ii) an image plate rotatively positioned immediately behind said rear side of said clock face;

iii) a first set of images on said image plate facing said clock face, each said image aligned with a corresponding image window, in a first position of said image plate;

iv) a second set of images on said image plate adjacent to first set of images with each image of said second set of images arranged to align with a corresponding image window when said image plate is rotated by a predetermined amount to a second position of said image plate;

v) means for selectively rotating said image plate back and forth between first and second positions to alternately align said first set of images with their respective image windows during AM hours and then align said second set of images with their respective image windows during PM hours, and continuously repeating the cycle; and vi) a plurality of light emitting diodes (LED) mounted behind said image plate with each LED positioned in alignment with an image window.

2. An educational audio/visual clock as recited in claim 1, wherein said time displaying means further includes a liquid crystal display (LCD) denoting the date and having means for setting the date.

3. An educational audio/visual clock as recited in claim 2, wherein said audio playback means comprises:
   a) an audio device having twenty-four individual audio clips looped to sequentially play one clip on each hour; and
   b) a speaker element in communication with said audio device.

4. An educational audio/visual lock as recited in claim 3, wherein said means for coordinating the audio clips with their respective images is an electromagnetic module in electrical communication with said power source, said LED's, said audio device, and with a connecting member that transfers said image plate to said image windows of said clock face.

5. An educational audio/visual dock as recited in claim 4, wherein the LED of a particular image window is lit when the clock reaches a top of a corresponding hour to provide backlighting for said image while the appropriate audio clip is playing wherein, after each hour, the next consecutive image is illuminated for the duration of the clip.

6. An educational audio/visual clock as recited in claim 5, wherein said first set of images are of the first twelve Presidents of the United States with each president consecutively appearing in the image window next to the numeric indicia corresponding with his term in office and said second set of images including the thirteenth though twenty-fourth presidents.

7. An educational audio/visual clock as recited in claim 6, further including an adjustable alarm with means of selectively setting said alarm.

8. An educational audiovisual clock as recited in claim 1, wherein said power source is at least one battery.

9. An educational audio/visual clock as recited in claim 1, wherein said power source is a power cord connected to a conventional electrical outlet.

* * * * *